Patented Sept. 7, 1926.

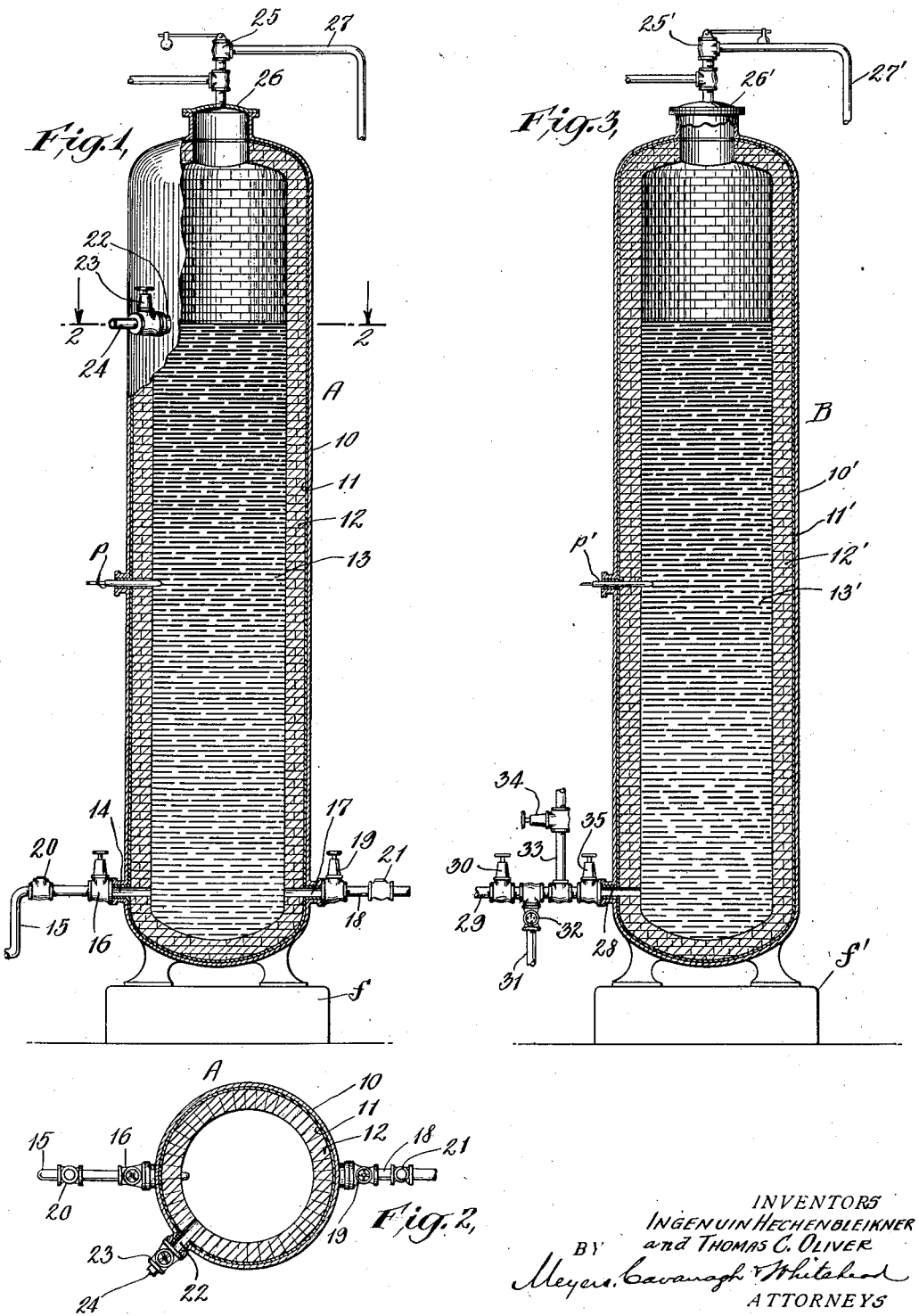

1,599,360

UNITED STATES PATENT OFFICE.

INGENUIN HECHENBLEIKNER AND THOMAS C. OLIVER, OF CHARLOTTE, NORTH CAROLINA.

METHOD OF AND APPARATUS FOR SEPARATING PETROLEUM SLUDGE.

Application filed March 16, 1923. Serial No. 625,675.

This invention relates to the recovering of the components of petroleum sludge obtained in the refining of oil, and more particularly to a method of and apparatus for effecting the separation of the petroleum sludge into its hydrocarbon and acid constituents; and has special reference to the provision of an apparatus in which the petroleum sludge may be efficiently treated at relatively high temperatures and pressures.

In the refining of petroleum, the crude oil or its fractional distillates is subjected to the action of sulphuric acid, the latter being used to react with the heavy hydrocarbons and other undesirable elements present in the crude oil; and as a result of this treatment there remains a sludge or acid tar which contains oil and other hydrocarbons combined with a diluted sulphuric acid. To recover the hydrocarbons and reclaim the acid, the sludge is treated to effect a separation of its hydrocarbon and acid components; and to effect this separation it has been proposed to mix the sludge with water and subject the mixture to heat at relatively high temperatures and pressures, this treatment resulting in the reclaiming of the oil constituent and the restoring of the acid to a condition which permits of purification and concentration with ease.

In carrying out the steps of this separation process, the sludge and water mixture is introduced into a closed vessel and is heated by application of external heat to the vessel, the mixture being subjected to heat at relatively high temperatures and pressures. In the working of the process a number of objections and difficulties have been met with which have prevented in a large measure the successful adoption of the process on a commercial scale. It has been found, for example, that the vessels in which the sludge is treated are relatively short-lived, the vessels being attacked mechanically and chemically at the high temperatures and pressures employed. Where for example lead lined steel shell autoclaves have been used, we have discovered that the lead lining will flow, buckle and separate from the shell at the temperatures used, and that the lining will moreover be chemically attacked by the sulphuric acid component at the high temperatures, this resulting in not only shortening the life of the relatively expensive vessels, but in frequent breakdowns and the consequent stopping of plant operation with the undesirable curtailing of the plant output incident thereto. To obviate these difficulties and to provide an apparatus which is constructed to successfully resist or withstand the destructive actions of the acid and heat at the temperatures and pressures under which the operations are carried on is a prime desideratum of our present invention.

The principal objects of our present invention may be said to include the provision of a method of and apparatus for efficiently treating the sludge at relatively high temperatures and pressures to effect a separation of the components thereof; the further provision of a method of and apparatus for subjecting the sludge to internal heat treatment to provide heat and agitation at the temperatures and pressures desired with the vessels employed so constructed as to withstand mechanical and chemical attack; and the still further provision of a method and apparatus for separating petroleum sludge or acid tar which may be practiced and operated with great economy, convenience and efficiency.

To the accomplishment of the foregoing and such other objects as will hereinafter appear, our invention consists in the elements and their relation one to the other, as hereinafter particularly described and sought to be defined in the claims; reference being had to the accompanying drawings forming a part thereof, and in which:—

Fig. 1 is an elevational view in cross-section of a vessel constructed in accordance with the principles of our invention and employed in a continuous separation process, Fig. 2 is a view taken in cross-section on the line 2—2, Fig. 1, and Fig. 3 is an elevational view in cross-section of a modified form of our invention employed in an intermittent or cyclic separation process.

In practicing the steps of the separation process in our invention, the petroleum sludge obtained as a product of the refining of petroleum oils is mixed with water and the mixture is subjected to the action of heat at a relatively high temperature and pressure, this being preferably carried out by injecting steam into a body of the sludge mixture contained in a vessel, and by digesting the said sludge mixture with the steam at a temperature of about 360° F. under a pressure of about 6 atmospheres for a period of time ranging from 1 to 3 hours depending upon the character or type of sludge being treated, this treatment resulting in the separation of the sludge into its hydrocarbon and sulphuric acid components.

As heretofore stated, in the working of this process the vessel in which the sludge is heated is readily attacked by the heat and the heated acid component, and the utilization of lead lined vessels has been found unsuccessful in practice, since the lead lining does not mechanically withstand the heat and other reactions taking place in the vessel, and does not chemically resist the action of the hot acid component, with the result that the vessels are too short-lived for general commercial adoption. After extensive experimentation, we have empirically found that if the lead-lined vessel is provided with a second refractory lining such as an acid-proof masonry lining so co-ordinated with the lead lining as to mechanically support the same and obviate the buckling and separation of the same from the vessel, and as to prevent chemical attack of the lead lining by the hot sulphuric acid, that the destructive tendencies of the reactions taking place may be substantially eliminated.

Referring now to Figs. 1 and 2 of the drawings, we show a vessel generally designated as A built in accordance with our invention and used in the practice of our continuous method of separating sludge described and claimed in our copending application Ser. No. 626,272 filed March 20, 1923, the said vessel A comprising preferably a cylindrical-shaped steel shell 10 vertically mounted upon a concrete foundation $f$, the said shell being provided with an intermediate lining 11 made of lead and an inner masonry lining 12 which preferably comprises an acid-proof brick structure superposed on the lead lining 11 and functioning to mechanically support the same as well as to substantially prevent the sludge body 13 under treatment from reaching and attacking the same.

As described in our copending application above referred to, in the practice of the process a body of sludge mixture 13 is first introduced into the vessel A and there subjected to the action of steam injected into the vessel, the sludge being heated to a temperature preferably at about 360° F. under a pressure about 6 atmospheres for a period of from 1 to 3 hours, after which separate streams of sludge and steam are continuously and simultaneously injected into the vessel to effect a chemical separation of the sludge, the chemically separated components being continuously discharged from the vessel in quantities equal to the sludge mixture introduced therein. To accomplish these ends, the vessel A is provided preferably adjacent its bottom end with an inlet duct 14 connected to a sludge supply line 15, a valve 16 being provided for controlling the flow of the sludge stream, and is further provided with a second inlet duct 17 communicating with a steam supply line 18, a valve 19 being provided in this line for controlling the flow of steam into the vessel. If desired, check valves 20 and 21 may be provided in the sludge and steam lines 15 and 18 respectively. In operation the sludge and steam streams are injected into the sludge body 13 at a predetermined rate so as to permit the sludge to be subjected to the heat treatment for a predetermined period, such as from about 1 to 3 hours, the treated sludge gradually rising to the top of the vessel by displacement for continuous discharge from the vessel for further treatment.

For effecting a continuous discharge of the treated sludge, there is preferably provided adjacent the top of the vessel A an overflow duct 22 controlled by a valve 23, the said duct communicating with a feed line 24 leading to other vessels (not shown), into which the chemically separated but mechanically intermixed sludge components are fed for obtaining a mechanical separation.

The vessel A may be provided with the pressure safety valve 25 connected to the top 26 of the vessel and leading into the drain pipe 27. For reading the temperature conditions in the vessel, the usual pyrometer $p$ may be employed.

Referring now to the modification shown in Fig. 3 of the drawings, the vessel B also comprises a vertically arranged cylindrical-shaped steel shell 10' provided with an intermediate lead lining 11' and a supporting and protecting masonry lining 12', the vessel B in this form of our invention being employed in a cyclic or intermittent process.

In the intermittent process the vessel B is first charged with a mixture 13' of sludge and water, after which steam is injected into the sludge, heating the same to the desired temperature and pressure, the digesting with steam being carried on for a period ranging from about 1 to 3 hours, the Eastern sludges being capable of being treated for the lesser period, and the Western sludges for the greater period. After this treatment the contents of the vessel are allowed to settle, the sulphuric acid component gravitating to the bottom and the hydrocarbon constituent rising to the top, the thus physically separated components being then withdrawn from the vessel prior to refilling the same with a new charge. To accomplish these functions there is preferably provided a single duct 28 through which the steam, water and sludge are introduced and through which the separated components are removed. For charging the vessel, sludge is first forced through a sludge line 29 controlled by a valve 30, after which water and then steam is introduced through a steam line 31 controlled by valve 32, the valves being operated to effect the desired results. For discharging the separated contents of the vessel there is provided a discharge line 33 controlled by a valve 34, the said line leading to acid and oil storage tanks (not shown). The duct 28 may if desired also be controlled by a common valve 35. Also if desired the vessel B may be provided with a safety line similar to that heretofore described, comprising a safety valve 25' connected to the top 26' of the vessel and leading to a drainage pipe 27'. Also the vessel B may be provided with the usual pyrometer $p'$.

While we have shown our invention in the preferred forms, it will be obvious that many changes and modifications may be made in the structure thereof, without departing from the spirit of the invention, defined in the following claims.

We claim:—

1. The method of separating petroleum sludge into its hydrocarbon and acid constituents which comprises subjecting a mixture of petroleum sludge and water to the action of an internal heat treatment at a high temperature and at a pressure greater than atmospheric in a closed pressure container having an exterior acid-proof lining and an interior refractory facing for the lining.

2. The method of separating petroleum sludge into its hydrocarbon and acid constituents which comprises subjecting a mixture of petroleum sludge and water to the action of an internal heat treatment at a temperature of about 360° F. and a pressure of about 6 atmospheres in a closed pressure container having an exterior acid-proof lining and an interior refractory masonry facing for the lining.

3. The method of separating petroleum sludge into its hydrocarbon and acid constituents which comprises subjecting a mixture of petroleum sludge and water in a vessel having an exterior lead lining and an interior superposed masonry lining to the action of separated streams of steam and sludge injected into the mixture to effect a reaction at a high temperature and under a high pressure.

4. The method of separating petroleum sludge into its hydrocarbon and acid constituents which comprises subjecting a mixture of the petroleum sludge and water in a vessel having an exterior lead lining and an interior acid-proof brick lining to the action of an internal heat treatment at a temperature of about 360° F. and a pressure of about 6 atmospheres.

5. An apparatus for use in treating petroleum sludge at high temperatures and at pressures greater than atmospheric to effect a separation of the same into sludge oil and sludge acid, comprising a pressure separator provided with an exterior lead lining and an interior superposed masonry lining adapted to withstand the action of the heat and the acid at the said temperatures and pressures.

6. An apparatus for use in treating petroleum sludge at temperatures of about 360° F. and at pressures of about 6 atmospheres to effect a separation of the sludge into sludge oil and sludge acid, comprising a pressure separator consisting of a steel shell having an intermediate lead lining and an inner masonry lining adapted to withstand the action of the heat and the acid at the said temperatures and pressures.

7. An apparatus for use in treating petroleum sludge at temperatures of about 360° F. and at pressures of about 6 atmospheres to effect a separation of the sludge into sludge oil and sludge acid, comprising an autoclave having an intermediate lead lining and an inner supporting acid-proof brick lining adapted to withstand the action of the heat and the acid at the said temperatures and pressures.

8. An apparatus for treating petroleum sludge at temperatures of about 360° F. and at pressures of about 6 atmospheres to effect a separation of the sludge into sludge oil and sludge acid, comprising a vessel having an intermediate lead lining and an inner masonry lining and separate inlet means for injecting simultaneously separate streams of steam and sludge into the vessel.

Signed by the said INGENUIN HECHENBLEIKNER, at Charlotte, in the county of Mecklenburg, and State of North Carolina, this 12th day of March, A. D., 1923.

INGENUIN HECHENBLEIKNER.

Signed by the said THOMAS C. OLIVER at New York, in the county of New York and State of New York, this 15th day of March, 1923.

THOMAS C. OLIVER.